United States Patent
Shinya

(10) Patent No.: US 12,041,213 B2
(45) Date of Patent: Jul. 16, 2024

(54) IMAGE PROCESSING APPARATUS IN WHICH FULL COLOR DOCUMENT IMAGES ARE PRINTED IN MONOCHROME, IMAGE PROCESSING METHOD, AND STORAGE MEDIUM

(71) Applicant: CANON KABUSHIKI KAISHA, Tokyo (JP)

(72) Inventor: Takeshi Shinya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/146,969

(22) Filed: Dec. 27, 2022

(65) Prior Publication Data

US 2023/0224421 A1    Jul. 13, 2023

(30) Foreign Application Priority Data

Jan. 13, 2022  (JP) ................................. 2022-004002

(51) Int. Cl.
*H04N 1/40* (2006.01)
(52) U.S. Cl.
CPC . *H04N 1/40012* (2013.01); *H04N 2201/0094* (2013.01)
(58) Field of Classification Search
CPC ................................................. H04N 1/40012
See application file for complete search history.

(56) References Cited

U.S. PATENT DOCUMENTS

| 2004/0080789 | A1* | 4/2004 | Anderson | .......... H04N 1/40012 358/3.21 |
| 2004/0257378 | A1* | 12/2004 | Braun | ................ G06K 15/1825 345/591 |
| 2008/0137148 | A1* | 6/2008 | Oh | ..................... H04N 1/40012 382/162 |
| 2020/0177764 | A1* | 6/2020 | Sugahara | ........... H04N 1/40012 |
| 2020/0322503 | A1* | 10/2020 | Eguchi | ................. H04N 1/6008 |
| 2021/0014370 | A1 | 1/2021 | Shinya | ..................... H04N 1/00 |

FOREIGN PATENT DOCUMENTS

JP         2017-38242         2/2017

* cited by examiner

*Primary Examiner* — Barbara D Reinier
(74) *Attorney, Agent, or Firm* — Venable LLP

(57) ABSTRACT

At the time of printing a color page image in monochrome, multi-dimensional color component values of each object included in the color page image are converted into a gray value. Then, in the processing to widen a difference between a first gray value and a second gray value, in a case where a color represented by the first color component value and a color represented by the second color component value do not belong to the same color group, the difference between the first gray value and the second gray value is made larger than that in a case where both the colors belong to the same color group.

12 Claims, 10 Drawing Sheets

FIG.6A

| Input image | R | G | B | Gray |
|---|---|---|---|---|
| 501 — type of red_1 | 255 | 128 | 128 | |
| 502 — type of red_2 | 255 | 130 | 128 | |
| 503 — type of blue | 153 | 153 | 255 | |

| Input image | R | G | B | Gray |
|---|---|---|---|---|
| 501 — type of red_1 | 255 | 128 | 128 | 166 |
| 502 — type of red_2 | 255 | 130 | 128 | 167 |
| 503 — type of blue | 153 | 153 | 255 | 165 |

| Input image | R | G | B | Gray |
|---|---|---|---|---|
| 503 — type of blue | 153 | 153 | 255 | 165 |
| 501 — type of red_1 | 255 | 128 | 128 | 166 |
| 502 — type of red_2 | 255 | 130 | 128 | 167 |

| Input image | R | G | B | Gray |
|---|---|---|---|---|
| 503 type of blue | 153 | 153 | 255 | 165 |
| 501 type of red_1 | 255 | 128 | 128 | 197 |
| 502 type of red_2 | 255 | 130 | 128 | 198 |

| Input image | R | G | B | Gray |
|---|---|---|---|---|
| 503 type of blue | 153 | 153 | 255 | 165 |
| 501 type of red_1 | 255 | 128 | 128 | 197 |
| 502 type of red_2 | 255 | 130 | 128 | 213 |

| Input image | R | G | B | Gray | ~1000 |
|---|---|---|---|---|---|
| 501'— type of red_1 | 155 | 28 | 28 | | |
| 502'— type of red_2 | 155 | 30 | 28 | | |
| 503'— type of blue | 53 | 153 | 155 | | |
| ⋮ | ⋮ | ⋮ | ⋮ | ⋮ | |

FIG.10B

| Input image | R | G | B | Gray | ~1001 |
|---|---|---|---|---|---|
| 501'— type of red_1 | 155 | 28 | 28 | 66 | |
| 502'— type of red_2 | 155 | 30 | 28 | 67 | |
| 503'— type of blue | 53 | 53 | 155 | 65 | |
| ⋮ | ⋮ | ⋮ | ⋮ | ⋮ | |

FIG.10C

| Input image | R | G | B | Gray | ~1002 |
|---|---|---|---|---|---|
| 503'— type of blue | 53 | 53 | 155 | 65 | |
| 501'— type of red_1 | 155 | 28 | 28 | 66 | |
| 502'— type of red_2 | 155 | 30 | 28 | 67 | |
| ⋮ | ⋮ | ⋮ | ⋮ | ⋮ | |

FIG.10D

| Input image | R | G | B | Gray | Flag | ~1003 |
|---|---|---|---|---|---|---|
| 503'— type of blue | 53 | 53 | 155 | 65 | 1 | |
| 501'— type of red_1 | 155 | 28 | 28 | 66 | 0 | |
| 502'— type of red_2 | 155 | 30 | 28 | 67 | 0 | |
| ⋮ | ⋮ | ⋮ | ⋮ | ⋮ | ⋮ | |

FIG.10E

| Input image | R | G | B | Gray | Flag | ~1004 |
|---|---|---|---|---|---|---|
| 503'— type of blue | 53 | 53 | 155 | 65 | 1 | |
| 501'— type of red_1 | 155 | 28 | 28 | 91 | 0 | |
| 502'— type of red_2 | 155 | 30 | 28 | 104 | 0 | |
| ⋮ | ⋮ | ⋮ | ⋮ | ⋮ | ⋮ | |

IMAGE PROCESSING APPARATUS IN WHICH FULL COLOR DOCUMENT IMAGES ARE PRINTED IN MONOCHROME, IMAGE PROCESSING METHOD, AND STORAGE MEDIUM

BACKGROUND

Field

The present disclosure relates to an image processing technique at the time of printing a full-color document in monochrome.

Description of the Related Art

In a general office, a document, such as a material for presentation created by using a document creation application or the like, is normally created in full color. However, cases are not few where even though a document image is created in full color, the document image is printed in monochrome (black monochrome). In the case such as this where a full-color document image (in the following, described as "color image") is printed in monochrome, grayscale conversion processing to convert color values a color image has into monochrome is necessary. Here, for example, in a case where a color image having color values in the RGB color space is printed in monochrome, processing to convert RGB values into gray values representing luminance is performed by performing the weighting computing by, for example, the NTSC weighted average method for the RGB values. At this time, in a case where colors whose RGB values are quite different from each other are converted into the same gray value or similar gray values, the color discrimination the color image has is reduced in the grayscale image. Then, the problem of the reduction in the color discrimination may occur in another grayscale conversion method, such as sRGB and RGB uniform. In this regard, Japanese Patent Laid-Open No. 2017-38242 has disclosed a technique to use a conversion table that makes converted gray values separate from each other in a case where the number of colors used within a color image is less than or equal to a predetermined number.

With the technique of Japanese Patent Laid-Open No. 2017-38242 described above, conversion is performed so that the gray value difference in the grayscale image is constant regardless of the original RGB values. Because of this, there is a case where the relationship of magnitude in color difference that can be recognized in the color image can no longer be recognized in the grayscale image. For example, it is assumed that there are three colors in total, that is, two types of red and one type of blue in a color image. In this case, the color difference between the one type of blue and the two types of red is large and the color difference between the two types of red is small and in the grayscale image that is obtained by the technique of Japanese Patent Laid-Open No. 2017-38242 described above, those color differences become difficult to recognize.

SUMMARY

The image processing apparatus according to the present disclosure is an image processing apparatus for printing a color page image in monochrome, including: a memory that stores a program; and a processor that executes the program to perform: converting (processing to convert) multi-dimensional color component values of each object included in the color page image into a gray value; and widening (processing to widen), in a case where a first gray value obtained by converting a first color component value of a first object of each of the objects and a second gray value obtained by converting a second color component value of a second object different from the first object are approximate to each other, a difference between the first gray value and the second gray value, wherein in widening the difference, in a case where a color represented by the first color component value and a color represented by the second color component value do not belong to the same color group, the difference between the first gray value and the second gray value is made larger than that in a case where both the colors belong to the same color group.

Further features of the present disclosure will become apparent from the following description of exemplary embodiments with reference to the attached drawings.

BRIEF DESCRIPTION OF THE DRAWINGS

FIG. 6A to FIG. 6C are each a diagram showing an example of a color value list;

FIG. 8A and FIG. 8B are each a diagram showing an example of a color value list;

FIG. 10A to FIG. 10E are each a diagram showing an example of a color value list.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<Configuration of Printing System>

Figure 1:
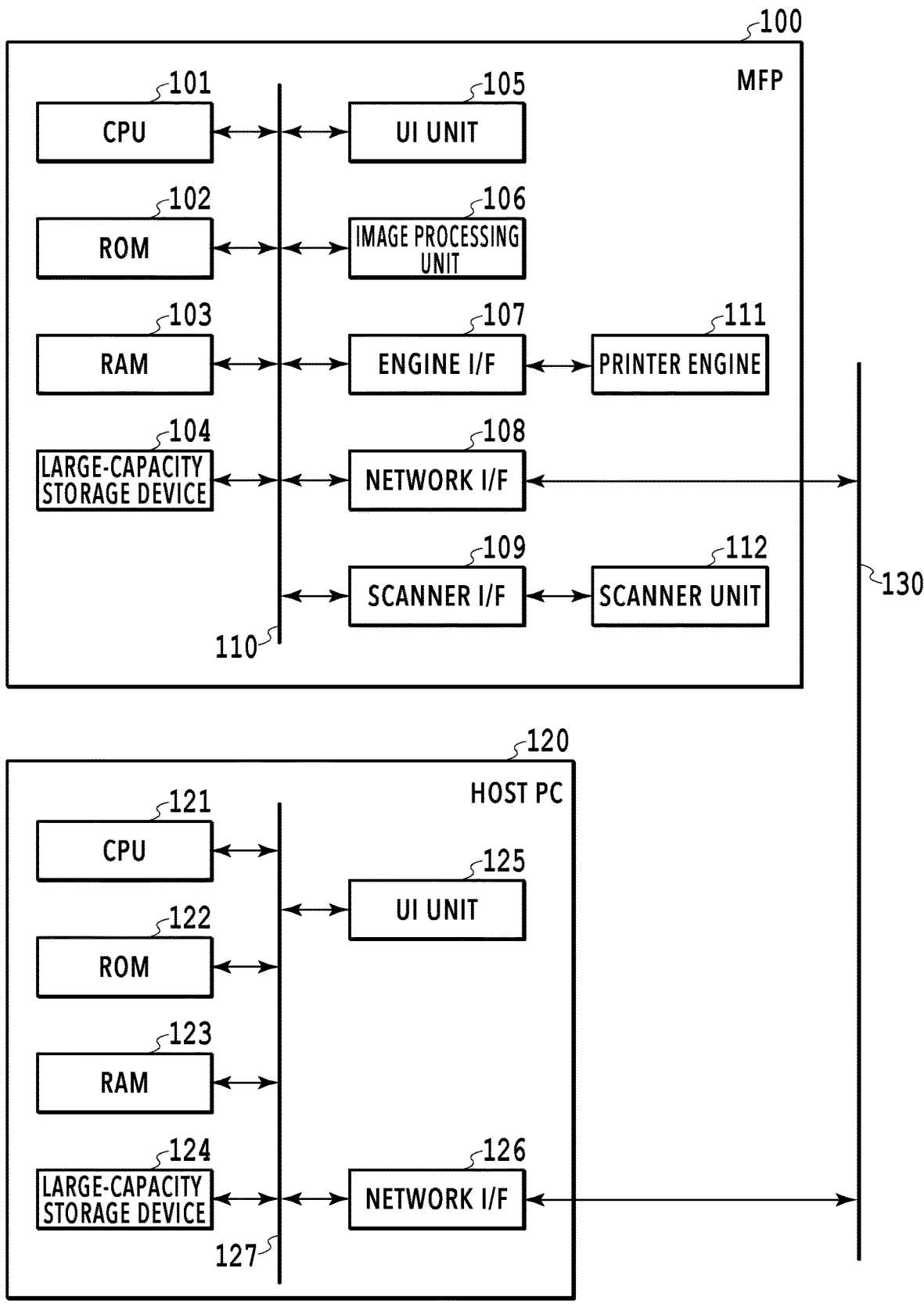
FIG. 1 is a block diagram showing an example of a hardware configuration of a printing system.

FIG. 1 a block diagram showing an example of the hardware configuration of a printing system according to the present embodiment. The printing system includes an MFP 100 as an image forming apparatus and a host PC 120 as an information processing apparatus and the MFP 100 and the host PC 120 are connected to each other via a network 130, such as a LAN.

<<Hardware Configuration of MFP>>

The MFP 100 comprises a CPU 101, a ROM 102, a RAM 103, a large-capacity storage device 104, a UI unit 105, an image processing unit 106, an engine interface (I/F) 107, a network I/F 108, and a scanner I/F 109. Each of these units is connected to one another via a system bus 110. Further, the MFP 100 comprises a printer engine 111 and a scanner unit 112. The printer engine 111 and the scanner unit 112 are connected to the system bus 110 via the engine I/F 107 and the scanner I/F 109, respectively. The image processing unit 106 may be configured as an image processing apparatus (image processing controller) independent of the MFP 100.

The CPU 101 controls the operation of the entire MFP 100. The CPU 101 performs various kinds of processing, to be described later, by reading programs stored in the ROM 102 onto the RAM 103 and executing the programs. The ROM 102 is a read only memory and in the ROM 102, system activation programs or programs for controlling the printer engine, and character data, character code information or the like are stored. The RAM 103 is a volatile random access memory and used as a work area of the CPU 101 and as a temporary storage area of various kinds of data. For example, the RAM 103 is used as a storage area for storing font data additionally registered by download, image files received from an external device, and the like. The large-capacity storage device 104 is, for example, an HDD and an SSD and in which various kinds of data are spooled and is used for storage of programs various tables, information files, image data and the like and used as a work area.

The UI (User Interface) unit 105 includes, for example, a liquid crystal display (LCD) comprising a touch panel function and displays a screen for notifying a user of the setting state of the MFP 100, the situation of processing being performed, the error state and the like. Further, the UI unit 105 receives various user instructions, such as instructions to input various setting values of the MFP 100 and instructions to select various buttons, via a predetermined user interface screen (GUI). It may also be possible for the UI unit 105 to separately comprise an input device, such as a hard key.

The image processing unit 106 analyzes drawing data described in PDL (in the following, called "PDL data") that is input from the host PC 120 via the network 130 and generates print image data that can be processed by the printer engine 111. PDL is an abbreviation of Page Description Language. Further, the image processing unit 106 performs predetermined image processing also at the time of transmitting image data stored by the BOX function to an external device. Details of the image processing unit 106 will be described later.

The engine I/F 107 is an interface for controlling the printer engine 111 in accordance with instructions from the CPU 101 at the time of performing printing. Via the engine I/F 107, engine control commands and the like are transmitted and received between the CPU 101 and the printer engine 111. The network I/F 108 is an interface for connecting the MFP 100 to the network 130. The network 130 may be a LAN or a public switched telephone network (PSTN). The printer engine 111 forms a multicolor image on a printing medium, such as paper, by using color materials (here, toner) of a plurality of colors (here, four colors of CMYK) based on print image data provided from the image processing unit 106. The scanner I/F 109 functions as an interface for controlling the scanner unit 112 in accordance with instructions from the CPU 101 at the time of reading a document by the scanner unit 112. Via the scanner I/F 109, scanner unit control commands and the like are transmitted and received between the CPU 101 and the scanner unit 112. The scanner unit 112 generates image data (scanned image data) by optically reading a document under the control of the CPU 101 and transmits the image data to the RAM 103 or the large-capacity storage device 104 via the scanner I/F 109.

<<Hardware Configuration of Host PC>>

The host PC 120 comprises a CPU 121, a ROM 122, a RAM 123, a large-capacity storage device 124, a UI unit 125, and a network I/F 126. Each of these units is connected to one another via a system bus 127. The CPU 121 is a processor that controls the operation of the entire host PC 120 and performs various kinds of processing by reading control programs and application programs stored in the ROM 122. The RAM 123 is used as a temporary storage area, such as a main memory and a work area, of the CPU 121. The large-capacity storage device 124 is, for example, an HDD and an SSD, and stores image data and the like, in addition to various programs, such as a printer driver. The UI (User Interface) unit 125 includes, for example, a liquid crystal monitor, a keyboard and the like and is used to display various GUIs and receive user instructions. The network I/F 126 is an interface that connects the host PC 120 to the network 130. The host PC 120 transmits the PDL data generated by using the installed printer driver to the MFP 100 via the network I/F 126 and causes the MFP 100 to perform printing processing. Further, the host PC 120 receives the image data transmitted from the MFP 100 via the network I/F 126 and edits, displays the image data and so on.

<Function Configuration of Printing System>

Figure 2:
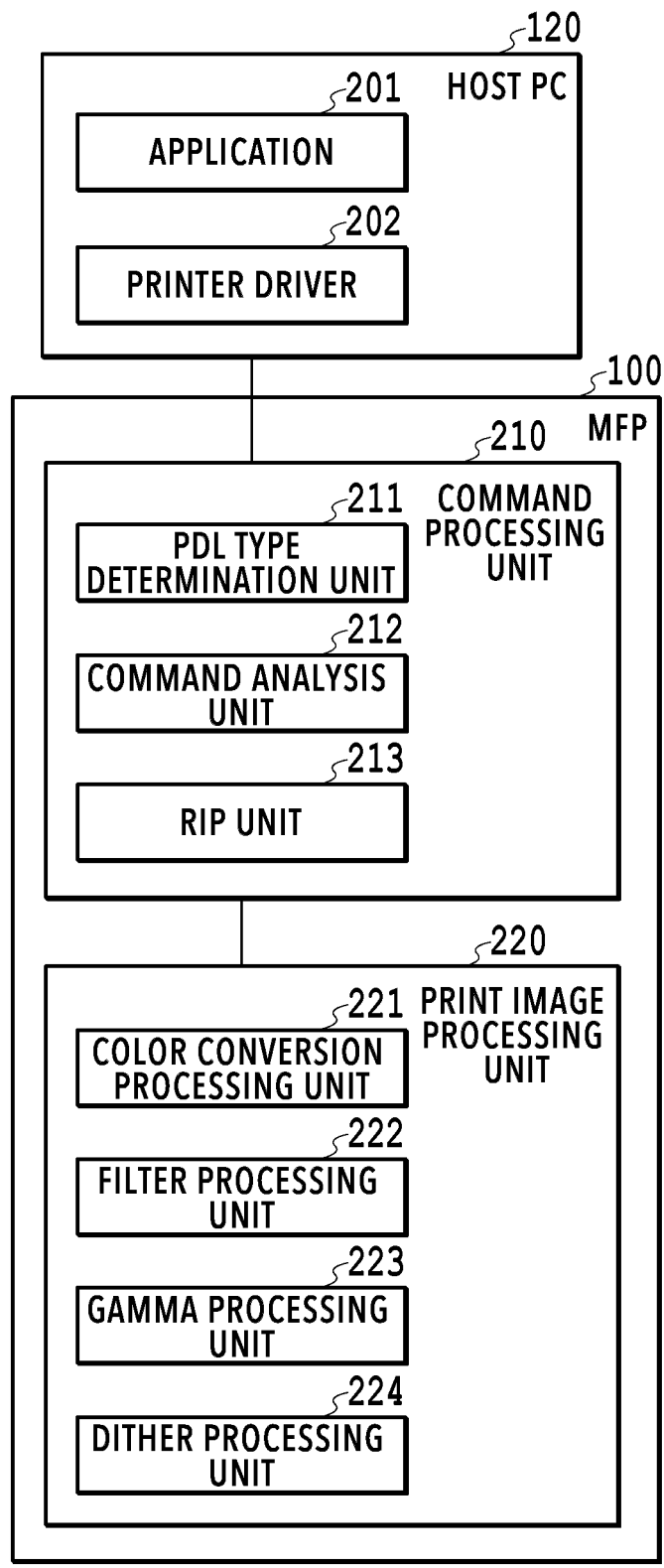
FIG. 2 is a block diagram showing an example of a function configuration of a host PC and an MFP.

FIG. 2 is a block diagram showing an example of the software configuration relating to the print function of the host PC 120 and the MFP 100. By using FIG. 2, the outline of the printing system according to the present embodiment is explained.

The host PC 120 has an application 201 and a printer driver 202. A user creates document data, such as presentation material, by using the application 201 installed in the host PC 120. Then, the user generates print instruction data (generally called "print job") of the document data by using the printer driver 202. In the print job, contents to be printed in accordance with the object attribute, such as text, graphics, and image, are specified for each page by page description language (PDL). The generated print job is sent to the MFP 100. The series of processing is implemented by the CPU 121 loading a program stored in the ROM 122 of the host PC 120 onto the RAM 123 and executing the program.

The MFP 100 has a command processing unit 210 and a print image processing unit 220 corresponding to the image processing unit 106 described previously. The print job received from the host PC 120 is analyzed in the command processing unit 210 and image data in the raster format is generated. Then, the print image processing unit 220 performs predetermined image processing for the raster image and print image data is generated. The generated print image data is sent to the printer engine 111 and printed and output. The series of processing is implemented by the CPU 101 loading a program stored in the ROM 102 of the MFP 100 onto the RAM 103 and executing the program.

<<Details of Function Configuration of MFP>>

The print job received from the host PC 120 is input to the command processing unit 210. The command processing unit 210 includes a PDL type determination unit 211, a command analysis unit 212, and a RIP unit 213. In the following, each unit within the command processing unit 210 is explained.

The PDL type determination unit 211 determines the type of PDL used in the print job. As the types of PDL, mention is made of, for example, PostScript (PS), PrinterCommand-Language (PCL), and the like.

The command analysis unit 212 extracts the command in accordance with the PDL type specified by the PDL type determination unit 211 from the print job and analyzes the contents to be printed. Here, the command include a control command a drawing command.

Figure 3A:
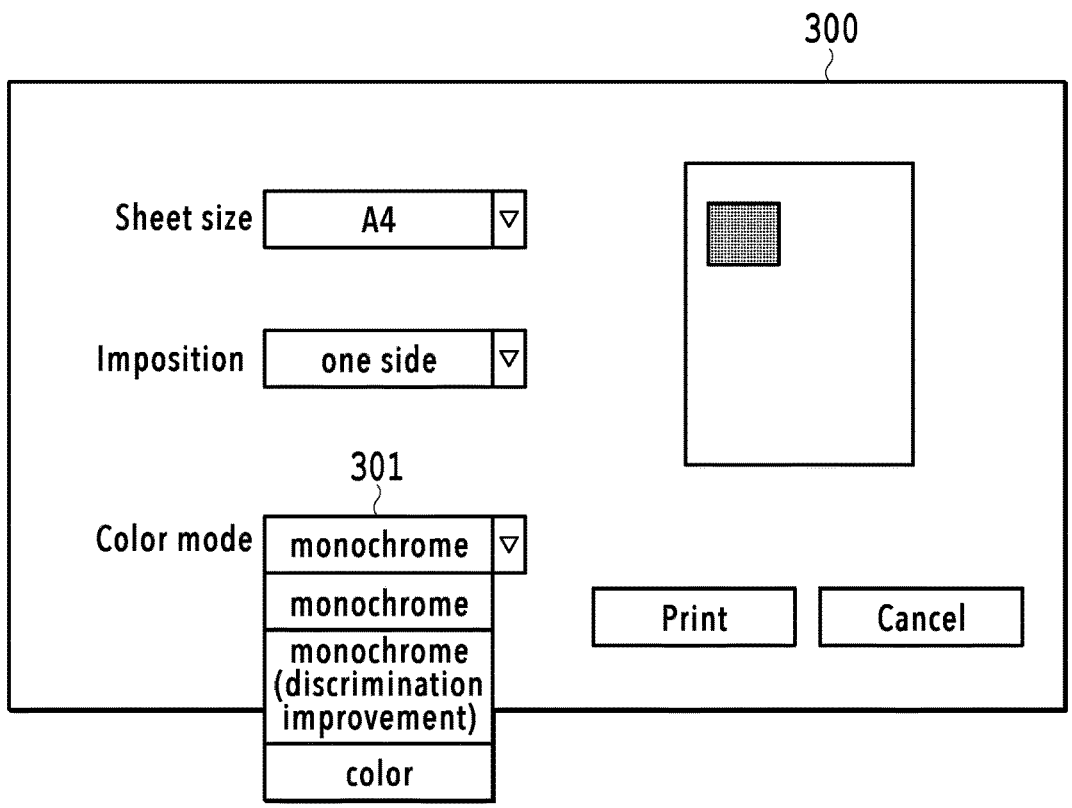
FIG. 3A and FIG. 3B are each a diagram showing an example of a UI screen of a printer driver.

The control command is a command that designates printing conditions and the like. For example, information on the sheet size, imposition, and color mode, designated by a user via a UI screen 300 of the printer driver 202 as shown, for example, in FIG. 3A is included in the control command. In a case of the UI screen 300, a user designates a desired color mode from three kinds of color mode, that is, "monochrome", "monochrome (discrimination improvement)", and "color". Then, in a case where "monochrome" is designated from a pulldown menu 301 of Color mode, the color of each object is designated by a one-dimensional gray value and in a case where "color" is designated, the color of each object is designated by three-dimensional RGB values. Then, in a case where "monochrome (discrimination improvement)" is designated, as in the case of "color", the color of each object is designated by RGB values. That is, in the present embodiment, in a case where "monochrome (discrimination improvement)" in which printing is performed in monochrome (black monochrome, but not limited to black) is designated, the same print job as that in a case where "color" is designated is generated and grayscale conversion, to be described later, is performed in the image forming apparatus 101. The color of each object in a case where "color" and "monochrome (discrimination improvement)" are designated only needs to be designated by multi-dimensional color component values in accordance with a predetermined color space and the color is not limited to being designated by RGB values.

As the drawing command, there are a color mode setting command that sets the color mode of a job and a color setting mode that sets a color. Further, there are a graphic drawing command to draw a graphic object, a character drawing command to draw a character object, a size setting command to set the character size of a character object, and a font setting command to set the font of a character object. In addition to those described above, a command to set coordinates and the thickness of a line, a command to draw an image, and the like are also included.

The RIP unit 213 generates a raster image in which each pixel has RGB vales in a case of color printing or a raster image in which each pixel has a gray value in a case of monochrome printing by performing drawing processing based on the analysis results of the command analysis unit 212. At that time, the RIP unit 213 also generates attribute information indicating the attribute of the object included in the raster image for each pixel. The generated raster image and attribute information are sent to the print image processing unit 220.

The print image processing unit 220 includes a color conversion processing unit 221, a filter processing unit 222, a gamma processing unit 223, and a dither processing unit 224. In the following, each unit within the print image processing unit 220 is explained.

The color conversion processing unit 221 converts the color values of each pixel into CMYK values in accordance with the color materials used in the printer engine 111 by performing color conversion processing for the raster image generated by the RIP unit 213.

The filter processing unit 222 performs filter processing, such as sharpness processing, for the raster image in which each pixel has CMYK values, for which color conversion processing has been performed by the color conversion processing unit 221. It may also be possible to obtain a raster image in which each pixel has CMYK values by performing color conversion processing after performing filter processing for the raster image generated by the RIP unit 213.

The gamma processing unit 223 performs gamma correction processing for implementing the smooth tone characteristic in accordance with the color reproducibility characteristic of the printer engine 111 for the raster image for which filter processing has been performed. For this gamma correction processing, normally, a one-dimensional LUT (lookup table) is used.

The dither processing unit 224 generates a halftone image representing each pixel by a halftone by performing dither processing for the raster image for which gamma correction processing has been performed. The data of the generated halftone image is sent to the printer engine 111 as print image data.

<Grayscale Conversion Processing>

Figure 4:
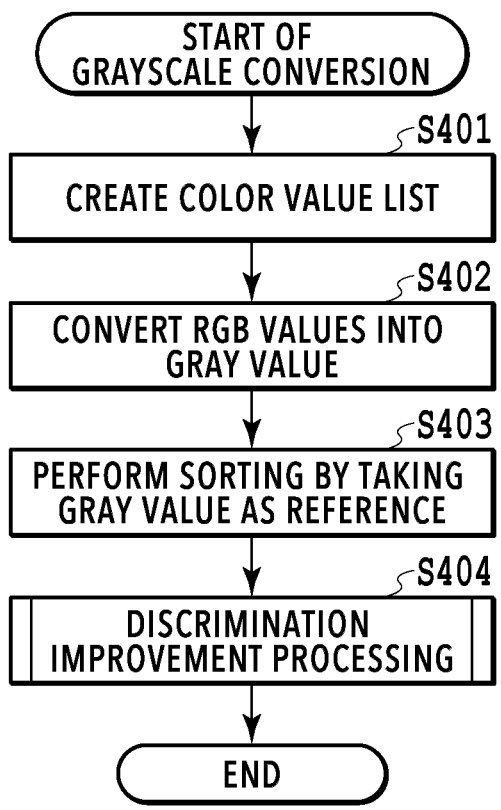
FIG. 4 is a flowchart showing a rough flow of grayscale conversion processing.
Figure 5A:
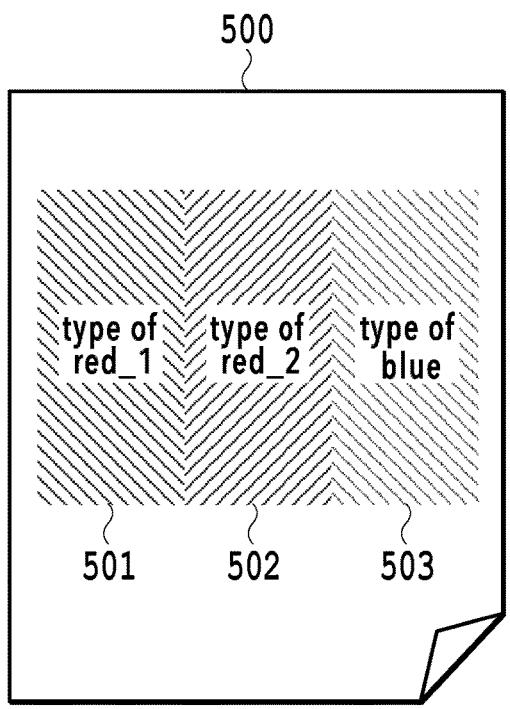
FIG. 5A is a diagram showing an example of a color page image and FIG. 5B is a diagram showing a drawing command group included in a print job thereof.

Following the above, grayscale conversion processing in the command analysis unit 212 in a case where monochrome printing to improve discrimination is designated in the print job is explained, which is the characteristic of the present embodiment. FIG. 4 is a flowchart showing a rough flow of the grayscale conversion processing according to the present embodiment. Here, explanation is given by taking a case as an example where a color page image 500 shown in FIG. 5A is subjected to printing processing in Color mode of "monochrome (discrimination improvement). It is assumed that in the color page image 500 in FIG. 5A, graphic objects 501 and 502 of two types of red between which there is a slight color difference and a graphic object 503 of one type of blue are arranged side by side. The characters in FIG. 5A, such as "type of red_1", "type of red_2", and "type of blue", are added for convenience of explanation. Here, the drawing-target objects are only graphic objects, but it is needless to say that another kind of object, such as a character object, may be accepted. In the following explanation, symbol "S" means a step.

Figure 5B:
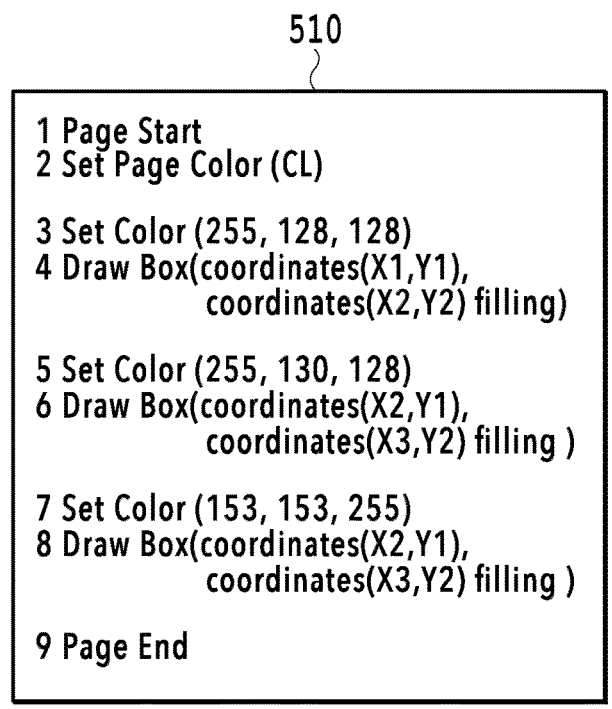

At S401, based on the drawing command included in the input print job, a color value list of the printing-target page is created. Specifically, processing to extract the color values (RGB values) designated in the color setting command and add the extracted color values to the list in association with each object is performed. FIG. 5B shows a drawing command group 510 included in the print job in a case where the color page image 500 is printed in "monochrome (discrimination improvement)". First, the contents of the drawing command group 510 are explained briefly. Here, it is assumed that the color page image 500 is an 8-bit image in which each pixel has 8-bit RGB values. In the drawing command group 510, the third and fourth drawing commands correspond to the graphic object 501 within the page image 500, the fifth and sixth drawing commands correspond to the graphic object 502, and the seventh and eighth drawing commands correspond to the graphic object 503. Then, the third color setting command "Set Color (255, 128, 128) indicates that a type of red color whose RGB values are R=255, G=128, and B=128 is set. Then, the fourth graphic drawing command "Draw Box (coordinates (X1, Y1), coordinates (X2, Y2) filling" indicates that a rectangular graphic object whose coordinates of the top-left end are (X1, Y1) and whose coordinates of the bottom-right end are (X2, Y2) is drawn. Similarly, the fifth drawing command is set to "Set Color (255, 130, 128)" and the sixth drawing command is set to "Draw Box (coordinates (X2, Y1), coordinates (X3, Y2)

filling". These commands give instructions to draw the red rectangular graphic object 502 next to the graphic object 501. Similarly, the seventh drawing command is set to "Set Color (153, 153, 255)" and the eighth drawing command is set to "Draw Box (coordinates (X3, Y1), coordinates (X4, Y2) filling". These commands give instructions to draw the blue rectangular graphic object 503 next to the graphic object 502. In a case of the drawing command group 510 in FIG. 5B, a color value list 600 as shown in FIG. 6A is obtained. The created color value list is stored in the RAM 107.

At S402, processing to convert the RGB values of each record in the color value list created at S401 into a gray value is performed. For example, conversion by weighted computing using formula (1) below is performed.

[Mathematical formula 1]

$$\text{Gray}=0.299R+0.587G+0.114B \quad\quad \text{formula (1)}$$

The gray value obtained by the above-described weighted computing is stored in the color value list. In a case of the color value list 600 shown in FIG. 6 described previously, first, for the graphic object 501, R=255, G=128, and B=128, and therefore, by the weighted computing described above, the corresponding gray value is "166". The same processing is performed also for the graphic objects 502 and 503 and the gray values "167" and "165" corresponding thereto respectively are calculated. In this manner, a color value list 601 shown in FIG. 6B is obtained. The above-described formula (1) is an example of the method of converting RGB values into a gray value and the method is not limited to this. It may also be possible to change the weighting ratio, or use a lookup table that associates RGB values whose tone is changed stepwise and a gray value corresponding thereto with each other in place of the weighted computing.

At S403, the records included in the color value list are sorted by taking the gray value as a reference. In the present embodiment, records are sorted in the ascending order so that the gray values for each object are arranged in order from the smallest gray value. A color value list 602 shown in FIG. 6C shows the results of performing sorting in the ascending order for the color value list 601 shown in FIG. 6B. It is known that the record of the graphic object 503 whose gray value is the smallest has moved to the top of the color value list.

At S404, processing to improve the discrimination of the color in the grayscale image is performed by modifying each gray value included in the sorted color value list as needed. Here, with reference to the flowchart in FIG. 7, the discrimination improvement processing according to the present embodiment is explained in detail.

<Discrimination Improvement Processing>

At S701, the color values (that is, RGB values and gray value) of the [i]th record and the color values of the [i+1]th record are obtained from the color value list. Here, i is a variable for scanning the color value list and is a positive integer.

At S702, the processing is branched according to whether the gray value included in the [i]th color values and the gray value included in the [i+1]th color values obtained at S701 are approximate to each other. Specifically, a difference is found by subtracting the [i]th gray value from the [i+1]th gray value and whether or not the difference is larger than a first threshold value (Thresh1) determined in advance is determined. It may be possible to use Thresh1 by reading the value stored in advance in the large-capacity storage device 104. Then, in a case where both gray values are not approximate to each other (difference is larger than Thresh1), it is determined that the current gray values provide sufficient discrimination and S703 to S705 are skipped and the processing advances to S706. On the other hand, in a case where both gray values are approximate to each other (difference is less than or equal to Thresh1), the processing advances to S703 to improve discrimination. Here, although depending on the performance of the printer engine 111, it is desirable for Thresh1 to be about "13 to 20" in a case where the color value of each pixel is represented in eight bits.

At S703, the processing is branched according to whether the color represented by the RGB values included in the [i]th color values and the color represented by the RGB values included in the [i+1]th color values obtained at S701 belong to the same color group. Specifically, ΔRGB representing a difference between both RGB values is found by using formula (2) below and whether or not the ΔRGB is larger than a second threshold value (Thresh2) determined in advance is determined. It may be possible to use Thresh2 by reading the value stored in advance in the large-capacity storage device 104.

[Mathematical formula 2]

$$\Delta RGB=\sqrt{(R_1-R_2)^2+(G_1-G_2)^2+(B_1-B_2)^2} \quad\quad \text{formula (2)}$$

In formula (2) described above, $R_1$, $G_1$, and $B_1$ represent the [i]th RGB values and $R_2$, $G_2$, and $B_2$ represent the [i+1]th RGB values. Then, in a case where both colors do not belong to the same color group (ΔRGB is larger than Thresh2), the processing advances to S705 to highlight the color difference by increasing the difference also at the gray value level. On the other hand, in a case where both colors belong to the same color group (ΔRGB is less than or equal to Thresh2), the processing advances to S704 to increase the color difference to the extent in which discrimination is provided also at the gray value level.

At S704, in order to improve discrimination between colors belonging to the same color group, whose color difference at the RGB values level is relatively small, processing to widen the interval between the converted gray values is performed. At this step, it is sufficient to widen the interval at the gray level so that the colors belonging to the same color group at the RGB values level can be distinguished and for example, the interval is widened so that the gray value difference is equal to Thresh1. In this case, it is sufficient to add an amount corresponding to Thresh1 to the [i+1]th gray value and subsequent gray values.

At S705, in order to improve discrimination between colors not belonging to the same color group, whose color difference at the RGB values level is relatively large, processing to widen the interval between the converted gray values is performed. At this step, it is sufficient to widen the interval so that colors not belonging to the same color group at the RGB values level are distinguished clearly also at the gray value level, and for example, the interval is widened so that the gray value difference is equal to a value obtained by multiplying Thresh1 by a coefficient for highlighting. In this case, it is sufficient to add an amount corresponding to Thresh1×coefficient for highlighting to the [i+1]th gray value and subsequent gray values. Here, it may be possible to use the coefficient for highlighting by reading the value stored in advance in the large-capacity storage device 104. For example, in a case where the coefficient for highlighting is taken to be "2", it is possible to double the interval between the gray values widened at S704, and therefore, it is made easier to discriminate between colors at the gray value level. The coefficient for highlighting may be fixed or may be variable in accordance with the magnitude of ΔRGB.

At S706, whether all the records included in the color value list are processed (scanned) is determined. In a case where there is an unprocessed record, the processing advances to S707 and the variable i is incremented (+1). After incrementing the variable i, the processing returns to S701 and the processing is continued. On the other hand, in a case where all the records are processed, this processing is exited.

Here, a specific example in a case where the above-described discrimination improvement processing is applied to the color value list 602 after the sorting in the ascending order shown in FIG. 6C is explained. In this case, it is assumed that the first threshold value (Thresh1)=16, the second threshold value (Thresh2)=40, and the coefficient for highlighting=2.

<<First Routine>>

First, from the color value list 602, as the color values of the [i]th record, the RGB values and the gray value of the graphic object 503 are obtained and as the color values of the [i+1]th record, the RGB values and the gray value of the graphic object 501 are obtained (S701). Here, the gray value difference is "1 (=166−165)" and this is less than or equal to Thresh1 and ΔRGB is calculated as "165" from formula (2) described above and this is determined to be larger than Thresh2 (No at S702, Yes at S703). Consequently, to the gray value "166" of the [i+1]th graphic object 501 and to the gray value "167" of the [i+2]th graphic object 502, "32=Thresh1 (16)×coefficient for highlighting (2)" is added (S705). As a result of that, a color value list 602' in FIG. 8A is obtained. In the color value list 602', the gray value of the graphic object 501 is changed to "198" and the gray value of the graphic object 502 is changed to "199", respectively. Then, there remains an unprocessed record within the color value list 602, and therefore, the variable i is incremented (Yes at S706, S707) and the next routine is performed.

<<Next Routine>>

Following the above, from the color value list 602', as the color values of the [i]th record, the RGB values and the gray value of the graphic object 501 are obtained and as the color values of the [i+1]th record, the RGB values and the gray value of the graphic object 502 are obtained (S701). Here, the gray value difference is "1 (=199−198)" and this is less than or equal to Thresh1 and ΔRGB is calculated as "2" from formula (2) described above and this is determined to be smaller than Thresh2 (No at S702, No at S703). Consequently, to the gray value "199" of the graphic object 502 corresponding to the [i+1]th record, the value of Thresh1 "16" is added (S704). As a result of that, a color value list 602" in FIG. 8B is obtained. In the color value list 602", the gray value of the graphic object 502 is changed from "199" to "215". Then, in this stage, there remains no unprocessed record within the color value list 602, and therefore, the discrimination improvement processing is completed. In this example, the gray value difference between the graphic objects 501 and 502 of two types of red is widened up to "17" and the gray value difference between the graphic object 501 and 502 of two types of red and the graphic object 503 of one type of blue becomes "32" or more. Due to this, it is made possible to maintain the discrimination of the color of the color image also in the grayscale image.

In a case where the discrimination improvement processing as above is exited, the grayscale conversion processing shown by the flowchart in FIG. 4 is also completed.

Figure 3B:
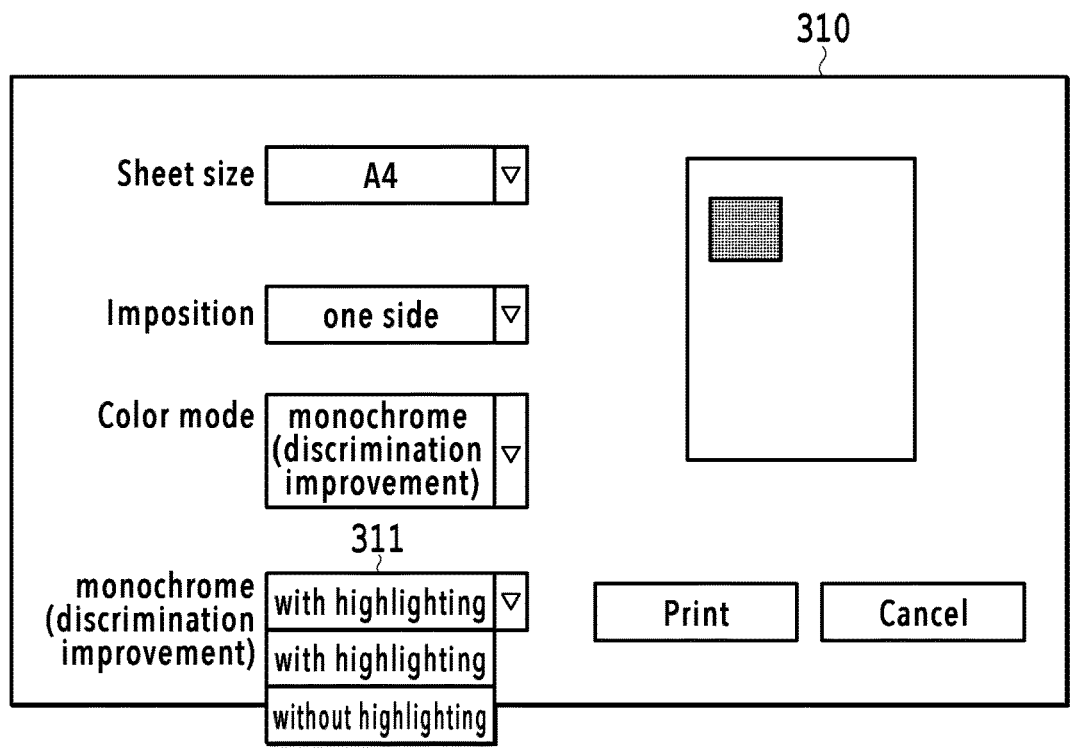

The above is the contents of the grayscale conversion processing according to the present embodiment. It may also be possible to perform the processing at S705 described above only in a case where "monochrome (discrimination improvement)" is selected on a UI screen in FIG. 3B and "with highlighting" is selected in a pulldown menu 311. That is, it may also be possible to design a configuration in which even in a case where "monochrome (discrimination improvement)" is selected as Color mode, it is possible for a user to select "without highlighting". In a case where "without highlighting" is selected, the determination processing at S703 is omitted and S704 is performed immediately. In this case also, it is possible to obtain a grayscale image in which color discrimination is secured.

Modification Example

In the present embodiment, the sorting that takes the gray value as a reference is performed in the ascending order, but it may also be possible to perform the sorting in the descending order. In a case where the sorting is performed in the descending order, the gray values are arranged from the top in order from the largest gray value, and therefore, it is sufficient to calculate Gray [i]−Gray [i+1] at S702 described above and compare it with Thresh1. After that, at the time of widening the gray value difference at S704 and S705, it is sufficient to subtract "Thresh1" or "Thresh1×coefficient for highlighting"

Further, in the present embodiment, to what extent the gray value difference is widened is determined based on the RGB value difference in the color page image, but for example, it may also be possible to determine the extent by converting the RGB values into color values based on another color space, such as Lab values. The Lab color space is a device-independent three-dimensional visually uniform color space that takes into consideration the human visual characteristic, which is determined by CIE (International Commission on Illumination).

Second Embodiment

In the first embodiment, the interval between gray values is set to a predetermined amount. In this case, depending on the number of colors within the color page image, an overflow or clipping occurs for the maximum gray value. Consequently, an aspect is explained as the second embodiment in which the occurrence of overflow or clipping is prevented by changing the interval of gray values depending on the number of colors. Explanation of the contents common to those of the first embodiment, such as the hardware configuration of the MFP 100, is omitted or simplified and in the following, different points are explained mainly.

<Discrimination Improvement Processing>

Figure 9:
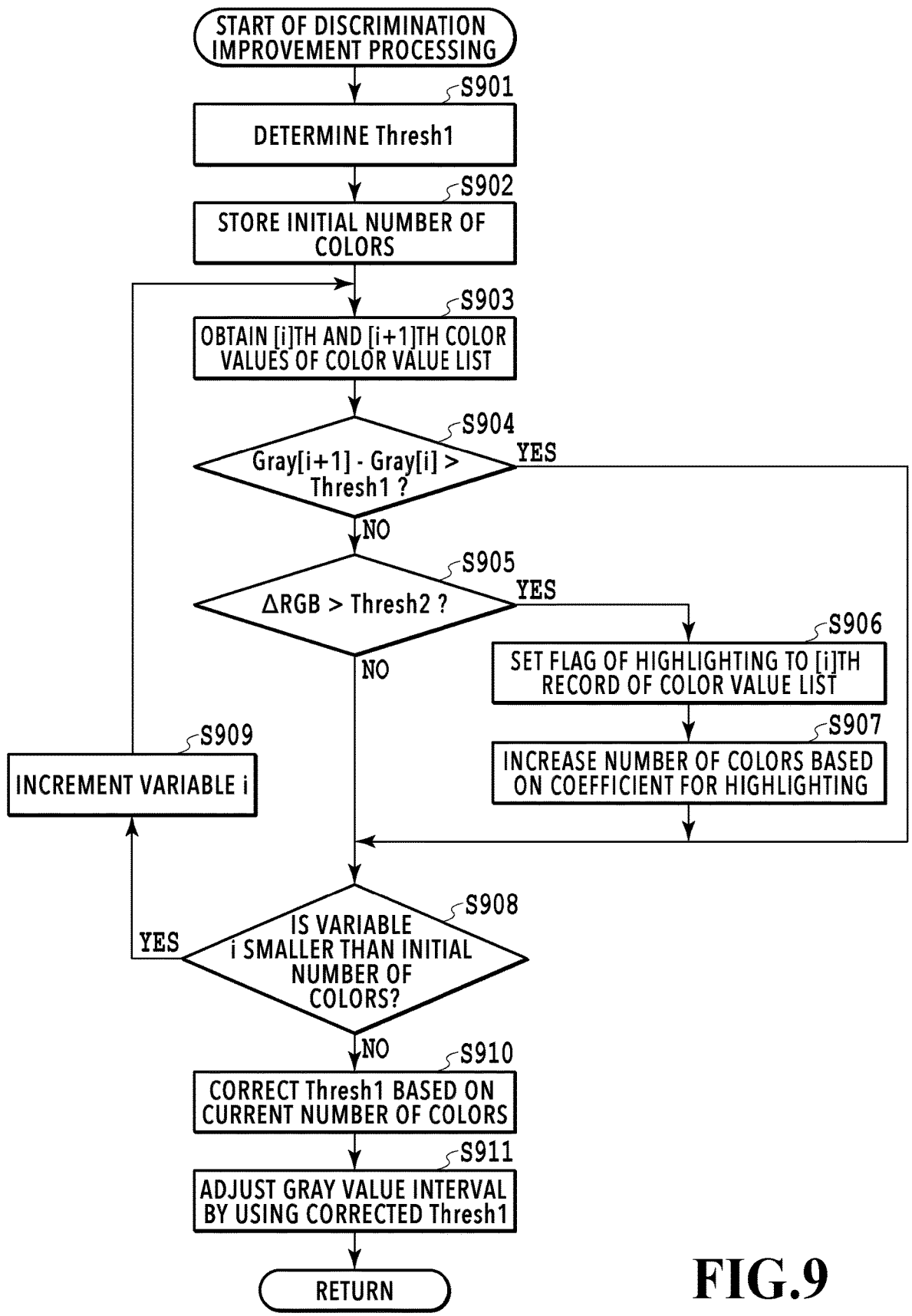
FIG. 9 is a flowchart showing a flow of discrimination improvement processing according to a second embodiment.

FIG. 9 is a flowchart showing details of the discrimination improvement processing according to the present embodiment. In the following, with reference to the flowchart in FIG. 9, detailed explanation is given.

First, at S901, the first threshold value (Thresh1) is determined. Here, for the determination of Thresh1, formula (3) below is used.

[Mathematical formula 3]

$$\text{Thresh1} = \text{range gray value can take} / \text{number of colors} - 1 \quad \text{formula (3)}$$

The range the gray value can take in a case where the color value of each pixel is represented in eight bits is "0 to 255=256" and for example, Thresh1 in a case where the "number of colors" is 17 is calculated as 256÷(17−1)=16. The number of colors is obtained from the color value list created at S401.

At S902, the number of colors included in the processing-target color page image is stored in the RAM 103 as the initial number of colors for the subsequent processing.

Figure 7:
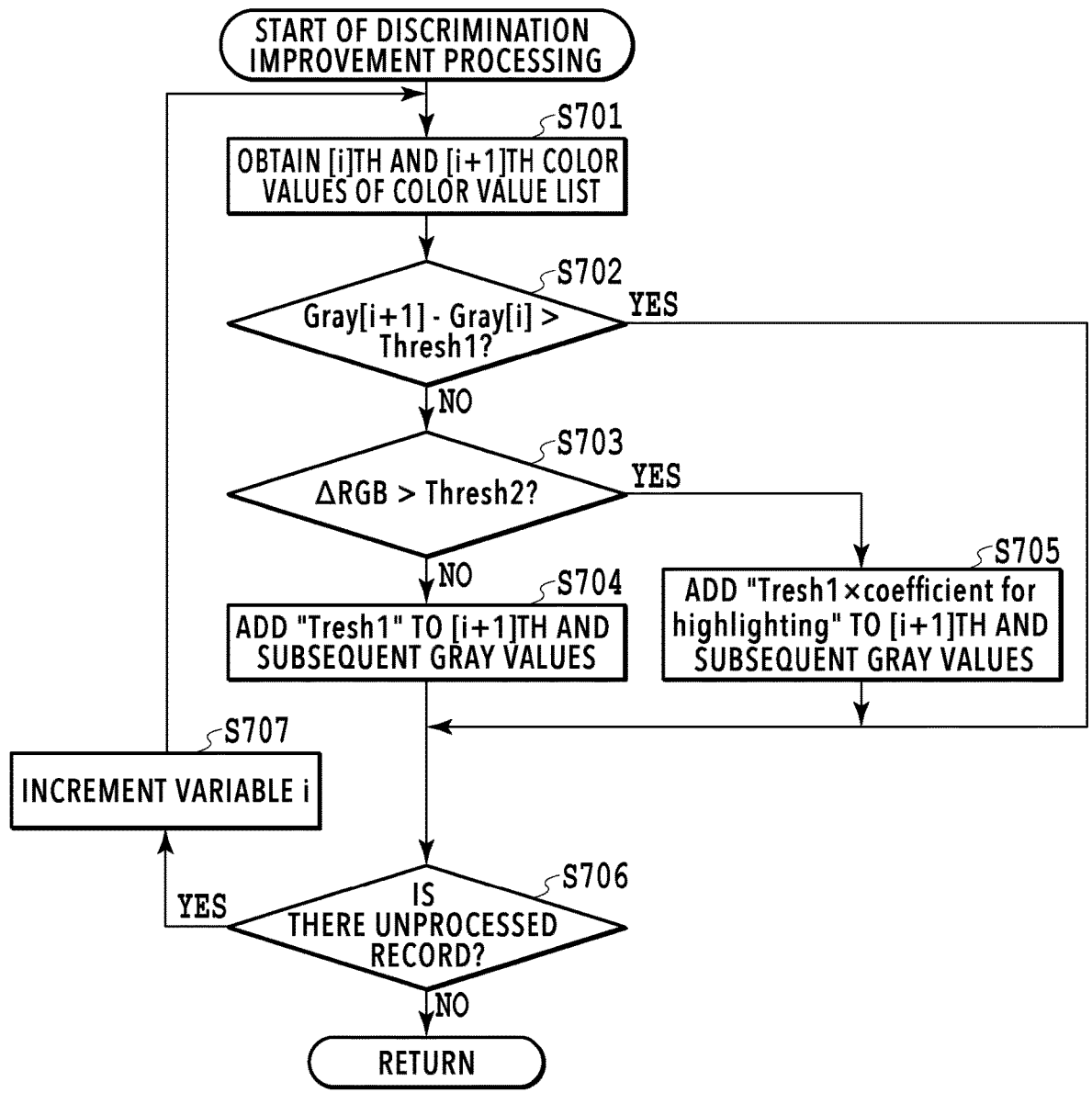
FIG. 7 is a flowchart showing a flow of discrimination improvement processing according to a first embodiment.

Subsequent S903 to S905 correspond to S701 to S703, respectively, in the flow in FIG. 7 of the first embodiment. First, from the color value list, the color values (that is, RGB values and gray value) of the [i]th record and the color values of the [i+1]th record are obtained (S903). Then, whether the obtained [i]th gray value and the [i+1]th gray value are approximate to each other is determined (S904). In a case where the gray value difference is larger than Thresh1, both gray values are not approximate to each other and it is determined that there is sufficient discrimination and the processing skips S905 to S907 and advances to S908. On the other hand, in a case where the gray value difference is less than or equal to Thresh1, both gray values are approximate, and therefore, the processing advances to S905 to improve discrimination. Then, whether the color represented by the [i]th RGB values and the color represented by the [i+1]th RGB values obtained at S903 are colors belonging to the same color group is determined (S905). In a case where the results of the determination indicate that ΔRGB is larger than Thresh2, it is determined that both colors are colors not belonging to the same color group and the processing advances to S906 and in a case where ΔRGB is less than or equal to Thresh2, it is determined that both colors are colors belonging to the same color group and the processing advances to S908.

At S906, to the [i]th record of the color value list, a flag (in the following, called "flag for highlighting") is set, which represents that processing to widen the gray value difference more by using the coefficient for highlighting at the time of widening the gray value difference is performed.

At next S907, processing to increase the initial number of colors stored at 902 by a percentage corresponding to the coefficient for highlighting is performed. Here, in a case where the coefficient for highlighting is "2", (2−1)=1 is added to the number of colors the number of times this step is performed.

Subsequent S908 and S909 correspond to S706 and S707, respectively, in the flow in FIG. 7 of the first embodiment. That is, whether all the records included in the color value list are processed (scanned) is determined (S908) and in a case where there is an unprocessed record, the variable i is incremented (S909). Then, after incrementing the variable i, the processing returns to S903 and the processing is continued. On the other hand, in a case where there is no unprocessed record, the processing advances to S910.

At S910, Thresh1 is corrected in accordance with the current number of colors. In the following, corrected Thresh1 is described as "Thresh1_corr". It is possible to obtain this Thresh1_corr by applying the number of colors increased by the processing so far to formula (3) described previously and performing computing again.

Then, at S911, the interval of the gray values is adjusted by using Thresh1_corr. In this adjustment, processing to sequentially add Thresh1_corr to the gray values of the second and subsequent records by taking the gray value of the first record in the sorted color value list as the starting point is performed. At that time, to the gray value of the record to which the flag for highlighting is set, Thresh1_corr×coefficient for highlighting is added in place of Thresh1_corr.

The above is the contents of the grayscale conversion processing according to the present embodiment.

Here, a specific example is explained in which the above-described discrimination improvement processing is applied to a color value list 1000 shown in FIG. 10A at S401. In this case, it is assumed that the initial number of colors=17, the first threshold value (Thresh1) determined first=16, the second threshold value (Thresh2)=40, and the coefficient for highlighting=2.

First, at S402, a color value list 1001 shown in FIG. 10B is obtained. Then, at S403, a color value list 1002 shown in FIG. 10C is obtained. Further, it is assumed that as a result of the determination processing (S903 to S905) based on the color values, a color value list 1003 shown in FIG. 10D is obtained (S906) and four colors are added to the initial number of colors and the current number of colors becomes 21 (S907). In this case, based on formula (3) described previously, Thresh1_corr≈13 (S910). Consequently, the gray value interval of each record is adjusted so as to be "13" in principle with the first record of the color value list 1003 being taken as the starting point. However, to the first record corresponding to a graphic object 503', the flag for highlighting is set, and therefore, the difference between the gray value of the first record and the gray value of the second record is adjusted so as to be "26", not "13". As a result of the processing such as this, as shown in a color value list 1004 in FIG. 10E, the gray value of a graphic object 501' is changed from "66" to "91" and the gray value of a graphic object 502' is changed from "67" to "104".

As above, in the present embodiment, depending on the number of colors included in the color page image, the gray value interval in the grayscale image is adjusted. Due to this, it is made possible to generate a grayscale image that secures color discrimination while preventing the occurrence of overflow and clipping.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the conversion technique according to the present disclosure, at the time of printing a color image in monochrome, it is made possible to convert the color image into a grayscale image while maintaining color discrimination in the color image.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-004002, filed Jan. 13, 2022 which is hereby incorporated by reference wherein in its entirety.

What is claimed is:

1. An image processing apparatus for printing a color page image in monochrome, comprising:
a memory that stores a program; and
a processor that executes the program to perform:
converting multi-dimensional color component values of each object included in the color page image into a gray value;
widening, in a case where a first gray value obtained by converting a first color component value of a first object of each of the objects and a second gray value obtained by converting a second color component value of a second object different from the first object are approximate to each other, a difference between the first gray value and the second gray value; and
in widening the difference, in a case where a color represented by the first color component value and a color represented by the second color component value do not belong to the same color group, widening the difference between the first gray value and the second gray value so that the difference is made larger than that in a case where both the colors belong to the same color group.

2. The image processing apparatus according to claim 1, wherein
in widening the difference,
sorting is performed for converted gray values of each object,
based on gray values for which sorting has been performed of each object, it is determined whether a difference between the first gray value and the second gray value adjacent to each other is larger than a first threshold value; and
in a case where the difference between the first gray value and the second gray value adjacent to each other is not larger than the first threshold value, it is determined whether the color represented by the first gray value and the color represented by the second gray value adjacent to each other belong to the same color group.

3. The image processing apparatus according to claim 2, wherein
in widening the difference,
in a case where it is determined that the first gray value and the second gray value adjacent to each other are approximate to each other, it is determined whether a difference between the first color component value and the second color component value corresponding respectively to the first gray value and the second gray value adjacent to each other is larger than a second threshold value, and
in a case where the difference between the first color component value and the second color component value is larger than the second threshold value, it is determined that the color represented by the first color component value and the color represented by the second color component value do not belong to the same color group.

4. The image processing apparatus according to claim 1, wherein
in widening the difference,
in a case where the color represented by the first color component value and the color represented by the second color component value belong to the same color group, the difference between the first gray value and the second gray value is widened by an amount corresponding to the first threshold value and
in a case where the color represented by the first color component value and the color represented by the second color component value do not belong to the same color group, the difference between the first gray value and the second gray value is widened by an amount corresponding to a value obtained by multiplying the first threshold value by a predetermined coefficient.

5. The image processing apparatus according to claim 4, wherein
in widening the difference,
the sorting is performed in ascending order,
in a case where the color represented by the first color component value and the color represented by the second color component value belong to the same color group, the difference between the first gray value and the second gray value is widened by adding the first threshold value to the second gray value, and
in a case where the color represented by the first color component value and the color represented by the second color component value do not belong to the same color group, the difference between the first gray value and the second gray value is widened by adding a value obtained by multiplying the first threshold value by a predetermined coefficient to the second gray value.

6. The image processing apparatus according to claim 4, wherein
in widening the difference,
the sorting is performed in descending order,
in a case where the color represented by the first color component value and the color represented by the second color component value belong to the same color group, the difference between the first gray value and the second gray value is widened by subtracting the first threshold value from the second gray value, and
in a case where the color represented by the first color component value and the color represented by the second color component value do not belong to the same color group, the difference between the first gray value and the second gray value is widened by subtracting a value obtained by multiplying the first threshold value by a predetermined coefficient from the second gray value.

7. The image processing apparatus according to claim 1, wherein
in widening the difference,
the first threshold value is determined by computing using a formula below first threshold value=range gray value can take÷(number of colors included in color page image−1), the number of colors included in the color page image is stored, the stored number of colors is increased by an amount corresponding to the number of times it is determined that the color represented by the first color component value and the color represented by the second color component value do not belong to the same color group, in a case where the color represented by the first color component value and the color represented by the second color component value belong to the same color group, the difference between the first gray value and the second gray value is widened by an amount corresponding to the first threshold value corrected based on the increased number of colors, and in a case where the color represented by the first color component value and the color represented by the second color component value do not belong to the same color group, the difference between the first gray value and the second gray value is widened by an amount corresponding to a value obtained by multiplying the first threshold value corrected based on the increased number of colors by a predetermined coefficient.

8. The image processing apparatus according to claim 7, wherein the correcting is obtaining the new first threshold value by applying the increased number of colors to the formula.

9. The image processing apparatus according to claim 1, wherein the multi-dimensional color component values are three-dimensional RGB values.

10. The image processing apparatus according to claim 1, wherein the object is a graphic object or a character object.

11. An image processing method for printing a color page image in monochrome, the method comprising the steps of:

converting multi-dimensional color component values of each object included in the color page image into a gray value;

widening, in a case where a first gray value obtained by converting a first color component value of a first object of each of the objects and a second gray value obtained by converting a second color component value of a second object different from the first object are approximate to each other, a difference between the first gray value and the second gray value; and in widening the difference, in a case where a color represented by the first color component value and a color represented by the second color component value do not belong to the same color group, widening the difference between the first gray value and the second gray value so that the difference is made larger than that in a case where both the colors belong to the same color group.

12. A non-transitory computer readable storage medium storing a program for causing a computer to perform an image processing method for printing a color page image in monochrome, the method comprising the steps of:

converting multi-dimensional color component values of each object included in the color page image into a gray value;

widening, in a case where a first gray value obtained by converting a first color component value of a first object of each of the objects and a second gray value obtained by converting a second color component value of a second object different from the first object are approximate to each other, a difference between the first gray value and the second gray value; and in widening the difference, in a case where a color represented by the first color component value and a color represented by the second color component value do not belong to the same color group, widening the difference between the first gray value and the second gray value so that the difference is made larger than that in a case where both the colors belong to the same color group.

* * * * *